(12) United States Patent
Nune et al.

(10) Patent No.: US 10,179,320 B2
(45) Date of Patent: Jan. 15, 2019

(54) PROCESS FOR MAKING CARBON-BASED NANO-RODS FROM SWITCHABLE IONIC LIQUIDS AND DEVICES AND PROCESSES INCORPORATING SAME

(71) Applicant: BATTELLE MEMORIAL INSTITUTE, Richland, WA (US)

(72) Inventors: Satish K. Nune, Richland, WA (US); David J. Heldebrant, Richland, WA (US); David B. Lao, Richland, WA (US); Jian Liu, Richland, WA (US); Greg A. Whyatt, West Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 392 days.

(21) Appl. No.: 15/078,807

(22) Filed: Mar. 23, 2016

(65) Prior Publication Data
US 2016/0279600 A1    Sep. 29, 2016

Related U.S. Application Data

(60) Provisional application No. 62/136,983, filed on Mar. 23, 2015.

(51) Int. Cl.
| | | |
|---|---|---|
| B01J 20/30 | (2006.01) | |
| B01J 20/20 | (2006.01) | |
| B01D 53/26 | (2006.01) | |

(52) U.S. Cl.
CPC ............ *B01J 20/205* (2013.01); *B01D 53/26* (2013.01); *B01J 20/3085* (2013.01); *B01D 2253/102* (2013.01); *B01D 2253/304* (2013.01); *B01D 2253/34* (2013.01); *B01D 2257/80* (2013.01); *B01D 2259/40088* (2013.01)

(58) Field of Classification Search
None
See application file for complete search history.

(56) References Cited

U.S. PATENT DOCUMENTS

| | | | | |
|---|---|---|---|---|
| 7,816,564 | B2* | 10/2010 | Balaban ................ | B82Y 30/00 423/447.1 |
| 8,252,264 | B2* | 8/2012 | Riehl .................... | B82Y 30/00 423/445 B |

OTHER PUBLICATIONS

Peretyazhko, T. S., et al, Pertechnetate (Tc04-) reduction by reactive ferrous iron forms in naturally anoxic, redox transition zone sediments from the Hanford Site, USA, Geochim Cosmochim Ac, 92, 2012, 48-66.
Wise, M. E., et al., Phase transitions of single salt particles studied using a transmission electron microscope with an environmental cell, Aerosol Science and Technology, 39, 2005, 849-856.
Murphy, D., et al., Review of the vapour pressures of ice and supercooled water for atmospheric applications, Quarterly Journal of the Royal Meteorological Society, 131, 2005, 1539-1565.

(Continued)

*Primary Examiner* — Anita Nassiri-Motlagh
(74) *Attorney, Agent, or Firm* — Derek H. Maughan (57) ABSTRACT

A method of making carbon-based nano-rods from switchable ionic liquids (SWIL) that incorporates the SWIL is disclosed. Resulting nano-rods provide adsorption and spontaneous desorption of water at selected relative humidity values that find use in selected applications and devices.

15 Claims, 9 Drawing Sheets

(56) References Cited

OTHER PUBLICATIONS

Nair, R. R., et al., Unimpeded Permeation of Water Through Helium-Leak-Tight Graphene-Based Membranes, Science, 335, 2012, 442-444.
Furmaniak, S., et al., Water adsorption on carbons—Critical review of the popular analytical approaches, Advances in Colloid and Interface Science, 137, 2008, 82-143.
Meng, L Y., et al., Superhydrophobic carbon-based materials: a review of synthesis, structure, and applications, Carbon Letters, 15, 2, 2014, 89-104.
Canivet, J., et al., Water adsorption in MOFs: fundamentals and applications, Chem Soc Rev, 2014, 43, 5594-5617.
Xin, L., et al., Dynamics and Isotherms of Water Vapor Sorption on Mesoporous Silica Gels Modified by Different Salts, Kinetics and Catalysis, 51, 5, 2010, 754-761.
Dominguez, A., et al., The role of water co-adsorption on the modification of ZnO nanowires using acetic acid, Phys Chem Phys, 16, 2014, 8509-8514.
Polarz, S., Shape Matters: Anisotrophy of the Morphology of Inoreganic Colloidal Particles—Synthesis and Function, Adv Funct Mater, 21, 2011, 3214-3230.
Nath, M., et al., Synthesis and characterization of magnetic iron sulfide nanowires, Adv Mater, 15, 2003, 2098-2101.
Anugwom, I., et aL, Switchable Ionic liauids (SILs) based on glycerol and acid gases, RSC Adv, 1, 2011, 452-457.
Hu, X., et al., Electrically Switchable Capillarity of Ionic Liquids, J Adhes Sci Technol, 26, 2012, 2069-2078.
Jessop, P. G., et al., Reversible nonpolar-to-polar solvent, Nature, 436, 2005, 1102-1102.
Jessop, P. G., et al., CO2-triggered switchable solvents, surfactants, and other materials, Energ Environ Sci, 5, 2012, 7240-7253.
Nixon, E. C., et al., Reversible ionic liquids as switchable surfactants for the synthesis of gold nanoparticles, Abstr Pap Am Chem S, 2011, 242.
Heldebrant, D. J., et al., Reversible Uptake of COS, CS2 and SO2: Ionic Liquids with O-Alkylxanthate, O-Alkylthiocarbonyl, and O-Alkylsulfite Anions, Chem-Eur J, 15, 2009, 7619-7627.
Lu, W., et al., The large-scale synthesis and characterization of carbon nanotubes for adsorption of water on activated carbon: Comparison of simulation and experiment, Nanotechnology, 17, 2006, 5702-5706.
McCallum, C. L, et al., A molecular model for adsorption of water on activated carbon: Comparison of simulation and experiment, Langmuir, 15, 1999, 533-544.
Omar, A. M. E., et al., Water sorption and time-dependent crystallization behaviour of freeze-dried lactose-salt mixtures, Lwt-Food Sci Technol, 40, 2007, 520-528.
Boursiquot, S., et al., The dry oxidation of tetragonal FeS1—x mackinawite, Phys Chem Min, 28, 2001, 600-611.
Li, J.-S. et al., Heteroatoms ternary-doped porous carbons derived from MOFs as metal-free electrocatalysts for oxygen reduction reaction, Scientific Reports, 4, 2014, 1-8.
Casanovas, J., et al., Origin of the Large N 1s Binding Energy in X-ray Photoelectron Spectra of Calcined Carbonaceous Materials, J Am Chem Soc, 118, 1996, 8071-8076.
Jeon, J.-W., et al., In Situ One-Step Synthesis of Hierarchical Nitrogen-Doped Porous Carbon for High-Performance Supercapacitors, ACS Applied Materials and Interfaces, 6, 2014, 7214-7222.
David, B., et al., Powders with superparamagnetic Fe3C particles studied with Mossbauer spectrometry, J Phys Conf Ser, 217, 2010, 1-4.
Thallapally, P. K, et al., Micro and mesoporous metal-organic frameworks for catalysis applications, Dalton T, 39, 2010, 1692-1694.
Rancourt, D. G., et al., Voight-Based Methods for Arbitrary-Shape Static Hyperfine Parameter Distributions in Mossbauer-Spectroscopy, Nucl Instrum Meth B, 58, 1991, 85-97.
Picaud, S., et al., Adsorption of water molecules on partially oxidized graphite surfaces: a molecular dynamics study of the competition between OH and COOH sites, Phys Chem Chem Phys, 10, 2008, 6998-7009.
Yang, Y. W., et al., Water adsorption on a NaCl (001) surface: A density functional theory study, Phys Rev B, 2006, 74, 1-10.
Chen, Y. W., et al., Structure and stability of thin water films on quartz surfaces, Appl Phys Lett, 97, 2010, 1-3.
Sundarajan, M., X-ray Scattering Study of Capillary Condensation in Mesoporous Silica, Master of Science Thesis, Ohio University, 2013, 1-100.
Morishige, K., Kinetics of Capillary Condensation of Water in Mesoporous Carbon: Nucleation and Meniscus Growth, J Phys Chem C, 119, 2015, 18287-18292.
Ashbaugh, H. S., Solvent cavitation under solvophobic confinement, The Journal of Chemical Physics, 139, 2013,30 1-13.
Sharma, S., et al., Evaporation rate of water in hydrophobic confinement, P Natl Acad Sci USA, 109, 2012, 4365-4370.
Lum, K., et al., Hydrophobicity at small and large length scales, J Phys Chem B, 103, 1999, 4570-4577.
Cerdeirina, C. A., et al., Evaporation Length Scales of Confined Water and Some Common Organic Liquids, J Phys Chem Lett, 2, 2011, 1000-1003.
Hummer, G., et al., Water conduction through the hydrophobic channel of a carbon nanotube, Nature, 414, 2001, 188-190.
Xu, L. M., et al. Liquid-Vapor Oscillations of Water Nanoconfined between Hydrophobic Disks: Thermodynamics and Kinetics, J Phys Chem B, 114, 2010, 7320-7328.
Leung, K., et al., Dynamics of capillary drying in water, Phys Rev Lett, 90, 2003, 1-4.
Pangali, C., et al., Monte-Carlo Simulation of the Hydrophobic Interaction, J Chem Phys, 71, 1979, 2975-2981.
Luzar, A., Activation barrier scaling for the spontaneous evaporation of confined water, J Phys Chem B, 108, 2004, 19859-19866.
Wallqvist, A., et al., Computer-Simulation of Hydrophobic Hydration Forces on Stacked Plates at Short-Range, J Phys Chem-Us, 99, 1995, 2893-2899.
Rabinovich, Y. I., et al., Direct Measurements of Long-Range Surface Forces in Gas and Liquid-Media, Adv Colloid Interfac, 16, 1982, 63-78.
Israelachvili, J., et al., The Hydrophobic Interaction is Long-Range, Decaying Exponentially with Distance, Nature, 300, 1982, 341-342.
Morrone, J. A., et al., Interplay between Hydrodynamics and the Free Energy Surface in the Assembly of Nanoscale Hydrophobes, J Phys Chem B, 116, 2012, 378-389.
Sharma, S., et al., Free Energy Barriers to Evaporation of Water in Hydrophobic Confinement, J Phys Chem B, 116, 2012, 13282-13289.
Chen, H. Y., et al, Experimental and numerical study on water sorption over modified mesoporous silica, Adsorption 21, 2015, 67-75.
Peng, X., et al., Water Adsorption in Metal-Organic Frameworks with Open-Metal Sites, Aiche J, 61, 2015, 677-687.
Sajanlal, P. R., et al., Anisotropic nanomaterials: structure, growth, assembly, and functions, Nano Reviews, 2, 2011, 1-62.
Wang, Y., et al., Synthesis of CoPt nanorods in ionic liquids, J Am Chem Soc, 127, 2005, 5316-5317.
Gutel, T., et al., Organized 3D-alkyl imidazolium ionic liquids could be used to control the size of in situ generated ruthenium nanoparticles?, J Mater Chem, 19, 2009, 3624-3631.
Kim, T. Y., et al., Ionic-Liquid-Assisted Formation of Silver Nanowires, Agnew Chem Int Edit, 48, 2009, 3806-3809.
Shakthivel, D., et al., Vapor-liquid-solid growth of Si nanowires: A kinetic Analysis, J Appl Phys, 112, 2012, 1-14.

\* cited by examiner

PROCESS FOR MAKING CARBON-BASED NANO-RODS FROM SWITCHABLE IONIC LIQUIDS AND DEVICES AND PROCESSES INCORPORATING SAME

CROSS REFERENCE TO RELATED APPLICATIONS

This is a non-provisional application that claims priority from U.S. Provisional Patent Application No. 62/136,983 filed 23 Mar. 2015, which is incorporated in its entirety herein.

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

FIELD OF THE INVENTION

The present invention relates generally to nanomaterials and methods for making nanomaterials. More particularly, the present invention relates to a new method for making carbon-based nano-rods, a material composition, and devices and processes that incorporate the carbon-based nano-rods for selected water-management applications. Carbon-based nano-rods of the present invention adsorb and spontaneously desorb (release) moisture as a function of relative humidity.

BACKGROUND OF THE INVENTION

Nanomaterials play a critical role in the chemistry of modern materials and products that incorporate nanotechnologies. For example, anisotropic nanomaterials such as nanowires and nano-rods exhibit properties that are useful for designing devices with desired functions. However, synthesis of nanomaterials remains a challenge. Conventional solution-based processes are inefficient due to an inability to control surface morphologies, or physical and chemical properties of the resulting materials. In addition, these processes typically require harsh reaction conditions, expensive heterogeneous templates, and environmentally problematic solvents and surfactants. Conventional processes are also energy intensive and thus cost-prohibitive. Another challenge for wide-scale implementation of nanomaterials in industrial applications is a need to manage water effectively. Water management, for example, is central in applications including heating, ventilation, and air conditioning (HVAC); catalysis; natural gas production; bio-oil separation; and energy storage. Various classes of materials include large surface areas and large distributions of pores that can manage water in various processes including, for example, various types of carbon, silica gels, and metal organic frameworks (MOFs). However, to date, controlled synthesis of nanomaterials that addresses manufacturing issues described previously and that provides desired water adsorption and desorption properties still remains unresolved.

SUMMARY OF THE INVENTION

The present invention includes a new method for making carbon-based nano-rods. The method of making includes incubating a nano-rod growth medium comprising a switchable ionic liquid including an amidine- or guanidine-containing base (cation$^+$) and an alkyl xanthate (anion$^-$), with an added iron (III) salt, at a selected temperature for a time sufficient to form the carbon-based nano-rods of a selected size. Components of the SWIL are incorporated into the structure of the resulting nano-rods.

In other embodiments, the method includes combining a switchable ionic liquid (SWIL) comprising an amidine- or guanidine-containing base (cation$^+$), and an alkyl xanthate (anion$^-$), with an added iron (III) salt, in an inert or air-free gas to form a growth medium; and incubating the growth medium at a selected temperature for a time sufficient to form the carbon-based nano-rods of a selected size.

In some embodiments, the SWIL includes a 1:1 mole equivalent ratio of the amidine- or guanidine-containing base and an organic alcohol that forms a solution. Then, an equal equivalent of a trigger reagent is added to the solution to form the SWIL.

In some embodiments, the amidine- or guanidine-containing base (cation$^+$) comprises diazabicyclo [5.4.0]-undec-7-ene (DBU), or 1,1,3,3 tetramethyl guanidine (TMG).

In various embodiments, the organic alcohol includes a normal alcohol with a carbon number from C1 to C16. In some embodiments, the organic alcohol is 1-hexanol.

In the exemplary embodiment, the trigger reagent that yields the SWIL is carbon disulfide ($CS_2$).

In the exemplary embodiment, the iron (III) salt that forms the growth medium is a pure iron (III) chloride salt derived by distillation or sublimation. In some embodiments, the iron salt may include a concentration in the SWIL from about 0.1M to about 0.2M, or from about 0.5% to about 10% by weight.

Incubation of the reagents in the nano-rod growth medium is performed at a temperature from 180° C. to 275° C.

Incubation of the reagents in the nano-rod growth medium is performed typically for a time of about 4 hours or more. In some embodiments, incubation time is selected from about 16 hours to about 24 hours. In other embodiments, incubation time is selected above 24 hours. No limitations are intended.

In some embodiments, the method includes recovering the carbon-based nano-rods from the growth medium, e.g., by centrifugation in a polar organic solvent. In some embodiments, recovering the nano-rods includes diluting the growth medium with a polar solvent such as, for example, methanol (dry, air-free) and then centrifuging the solution to collect the isolated nano-rods.

In some embodiments, the method includes drying the carbon-based nano-rods recovered from the growth medium, by rinsing the nano-rods with an organic solvent, and then contacting the nano-rods with air or an inert atmosphere for a selected time to dry the carbon-based nano-rods. In some embodiments, drying the nano-rods includes rinsing the nano-rods with an alcohol selected from methanol, isopropanol, or combinations of these solvents.

Dimensions of the nano-rods can vary based on synthesis conditions and selected reagents. In various embodiments, nano-rods of the present invention can include various lengths, weights, and thicknesses. No limitations are intended. The carbon-based nano-rods also include a solid cross-section.

The nano-rods include a characteristic morphology (structure) that dynamically adsorbs and desorbs moisture as a function of relative humidity or moisture content in the atmosphere in contact with the nano-rods.

In some embodiments, the carbon nano-rods are formed in groupings of 2 or more carbon nano-rods with a nexus positioned between the nano-rods that binds or couples the carbon nano-rods together thereat.

The present invention also includes devices that provide selected water management functions for water management applications. The devices include two or more carbon nano-rods of a selected size with a nexus or junction positioned between the nano-rods that binds the nano-rods together. The nano-rods adsorb a first quantity of water when exposed to a first relative humidity at a selected pressure and temperature and spontaneously desorb (release) water when exposed to a second relative humidity greater than the first relative humidity at the same pressure and temperature.

The carbon nano-rods include a nexus at a selected location along the length between the nano-rods with a dimension that varies dynamically with relative humidity and accumulate moisture as a function of moisture or relative humidity.

Carbon-based nano-rods of the present invention adsorb and desorb moisture at temperatures from about 1° C. to about 99° C.

In some embodiments, the nano-rods adsorb and accumulate moisture at a relative humidity value above and below about 50%.

The device releases accumulated moisture into the gas phase when the nano-rods are exposed to a second relative humidity greater than the first relative humidity at the same pressure and temperature.

In some embodiments, the carbon-based nano-rods adsorb and accumulate moisture at a first (e.g., low) relative humidity and desorb moisture at a second (e.g., higher) relative humidity.

In some embodiments, the device is a component of a water recovery system or process. In some embodiments, the device is a component of a heating and cooling system or process. In some embodiments, the device is a component of a desiccation system or process. In some embodiments, the device is a component of a hydration system or process.

The present invention also includes a process for recovering water. The process includes contacting carbon-based nano-rods with a first gas at a first relative humidity to adsorb a first quantity of water up to a selected value; then contacting the carbon-based nano-rods containing the first quantity of water with a second gas at a second relative humidity higher than the first relative humidity to spontaneously desorb (release) a quantity of water from the nano-rods into the second gas to obtain a second quantity of water on the nano-rods lower than the first quantity of water; and then, recovering the water desorbed from the nano-rods.

In some embodiments, absorption of water from the first gas occurs at a temperature and pressure that are substantially the same as the temperature and pressure during desorption of water to the second gas.

In some embodiments, recovered water is delivered to a receiving vessel or chamber for collection.

In some embodiments, recovery of water is obtained in a desert or water-restricted environment.

The present invention also includes a process for heating and cooling (i.e., pumping heat). The process includes cooling a first bed of carbon-based nano-rods with a first gas at ambient temperature and a first (e.g., high) relative humidity to endothermically desorb water from the nano-rods to increase the relative humidity of the first gas. The cooling may include endothermically altering the morphology of the carbon nano-rods in their formed groupings. The process then includes heating a second bed of carbon-based nano-rods by adding heat from the first bed of carbon-based nano-rods to the first gas released from the first bed to increase the temperature and reduce relative humidity of the first gas thereby yielding a second gas with a higher temperature and a lower relative humidity. The process then includes contacting the second bed of carbon-based nano-rods with the second gas at the higher temperature and lower relative humidity to exothermically adsorb water to the carbon-based nano-rods. The contacting may include exothermically altering the morphology of the carbon-based nano-rods in their formed groupings. Then, the process includes cooling the second gas released from the second bed of the carbon-based nano-rods to a temperature near ambient temperature to increase the relative humidity of the second gas and introducing the second gas back to the first bed of carbon-based nano-rods as a first gas.

The process may further include switching the operation performed by the first and second beds at selected intervals such that cooling is obtained in the second bed and heating is obtained in the first bed to maintain a substantially constant temperature in the first and second beds. Cooling and heating may be performed with a respective heat source or heat sink to maintain the temperature in the first and second beds within ±10° C. of the average operating temperature of the carbon-based nano-rods in the respective beds.

The present invention also includes a composition with water adsorption and desorption properties suitable for water management applications and devices. The composition includes a material that adsorbs a first quantity of water when exposed to a first relative humidity at a selected pressure and temperature and spontaneously desorbs (releases) water when exposed to a second relative humidity greater than the first relative humidity at the same pressure and temperature.

The composition may include a majority concentration or portion of carbon-based nano-rods with a solid cross-section.

The material in the composition adsorbs the first quantity of water at all relative humidity values where the first relative humidity is less than the second relative humidity.

The carbon nano-rods in the composition adsorb water at a first (e.g., low) humidity and spontaneously expel up to half of the adsorbed water when the relative humidity exceeds a relative humidity threshold.

The material in the composition spontaneously desorbs water into the gas phase at the second relative humidity. In some embodiments, wherein the water desorbed when exposed to the second relative humidity is greater than 20% of the first quantity of adsorbed water. In some embodiments, the water desorbed when exposed to the second relative humidity is greater than 40% of the first quantity of adsorbed water.

Water management properties of the carbon nano-rods may be cycled permitting repeated adsorption and desorption cycles.

The material in the composition adsorbs water after desorption at the second relative humidity.

The purpose of the foregoing abstract is to enable the United States Patent and Trademark Office and the public generally, especially the scientists, engineers, and practitioners in the art who are not familiar with patent or legal terms or phraseology, to determine the nature and essence of the technical disclosure of the application. The abstract is neither intended to define the invention of the application, which is measured by the claims, nor is it intended to be limiting as to the scope of the invention in any way.

DETAILED DESCRIPTION

A method of making carbon-based nano-rods from a switchable ionic liquid (SWIL) is disclosed. Components of the SWIL are incorporated into the structure of the resulting nano-rods. Resulting nano-rods provide desired adsorption and spontaneous desorption properties that find use in various applications and devices. In the following description, embodiments of the present invention are shown and described by way of illustration of the best mode contemplated for carrying out the invention. It will be apparent that various modifications and alternative constructions may be made without departing from the spirit and scope of the invention as set forth in the claims listed hereafter. The present invention is intended to cover all such modifications, alternative constructions, and equivalents falling within the spirit and scope of the invention as defined in the claims. Accordingly, the description of the preferred embodiments should be seen as illustrative only and not limiting.

Figure 1:
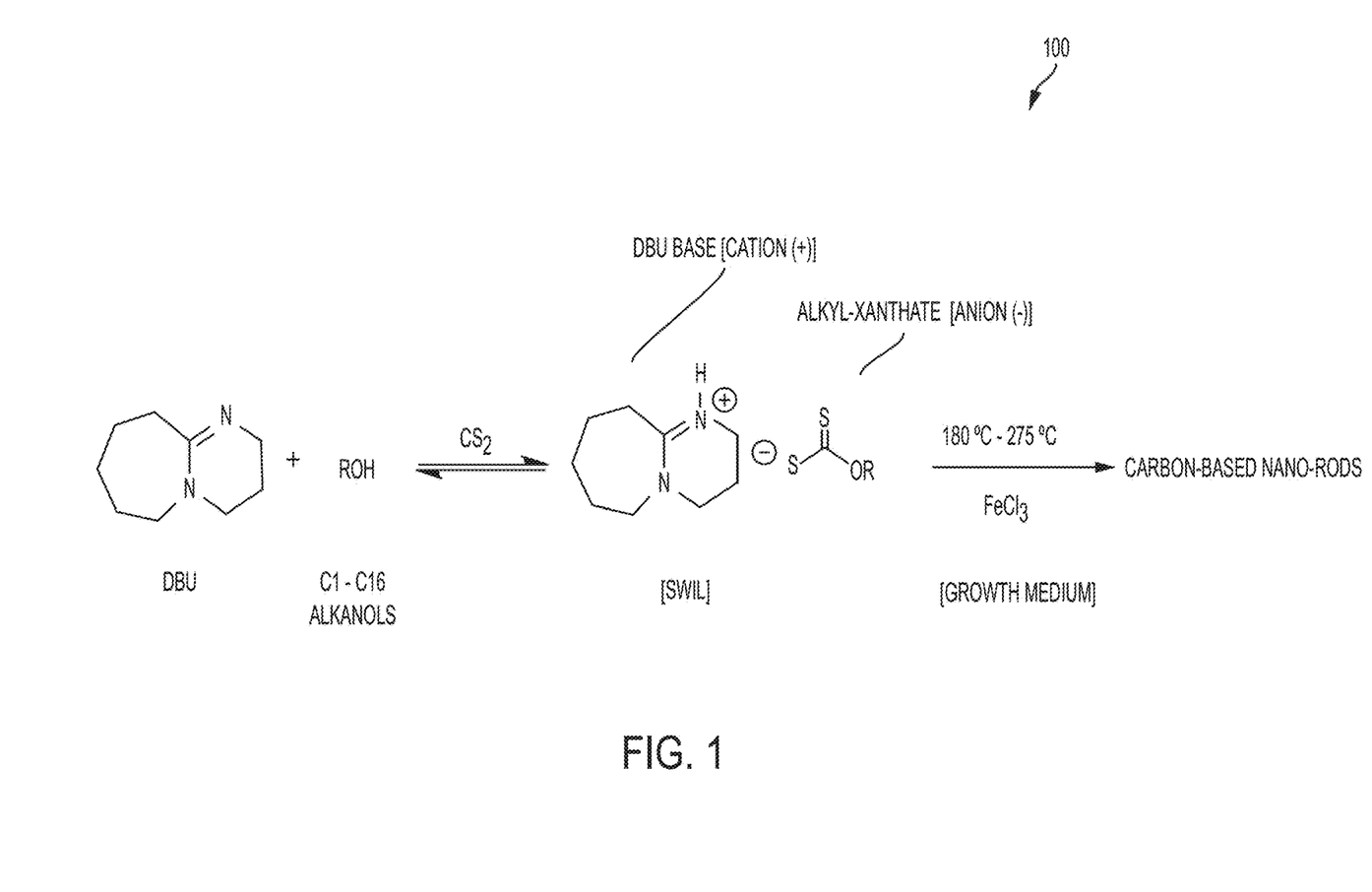
FIG. 1 presents an exemplary process for preparation of carbon rods, according to an embodiment of the present invention.

FIG. 1 shows an exemplary process 100 of the present invention for making carbon-based nano-rods. In the figure, the process may include: incubating a growth medium containing a switchable ionic liquid (SWIL) that includes an amidine- or guanidine-containing base (cation$^+$)] and an alkyl xanthate (anion$^-$), that is then combined with an iron (III) salt in a selected ratio at a selected temperature for a time sufficient to form the carbon-based nano-rods of a selected size. The SWIL is a switchable ionic liquid formed by combining an amidine- or guanidine-containing base with a primary alcohol. Amidine- or guanidine-containing bases include, but are not limited to, for example, DBU, TMG, and comparable organic bases. Primary alcohols suitable for use include, but are not limited to, for example, alkanols [e.g., $C_1$ (methanols) to $C_6$ (hexanols) to $C_{16}$], and combinations thereof. The SWIL can be switched from the neutral organic liquid form that includes the organic base and the primary alcohol to the polar ionic liquid form that includes the paired cationic and anionic species by introducing a chemical triggering reagent or compound into the neutral liquid. The chemical trigger initiates the conversion to the SWIL. Different SWILS can be generated by selecting a different amidine- or guanidine-containing base, a different organic alcohol, or a different trigger reagent.

In the exemplary embodiment, the SWIL is formed by combining 1,8-diazabicycloundec-7-ene (DBU) and a primary organic alcohol (ROH) such as, e.g., 1-hexanol in a selected (e.g., 1:1 equivalent) ratio at 0° C. to form a solution. Then, a corresponding (molar equivalent) of the trigger compound is added into solution (e.g., dropwise) to form the SWIL. In the exemplary embodiment, the chemical trigger is dry, air-free carbon disulfide ($CS_2$). The resulting SWIL contains a DBU (cation)$^+$ and alkyl xanthate (anion)$^-$. The "xanthate" has the formula $ROCS_2^-M^+$, where R is an alkyl group; $ROCS_2^-$ is the anion; and $M^+$ is the amidine- or guanidine-containing base cation. Xanthates are esters of xanthic acid with the structure $ROC(=S)SR'$.

In some embodiments, the ratio of DBU to alcohol (e.g., hexanol) to trigger compound (e.g., $CS_2$) is an equimole [e.g., 1:1:1] equivalent ratio.

The SWIL can be readily converted back to the neutral liquid by removing the chemical trigger from the liquid, for example, by heating the SWIL at a selected temperature (e.g., above 120° C.) to remove the trigger as a gas. Physical properties of the SWIL such as melting point, viscosity, polarity, and thermodynamic properties (e.g., $\Delta H$ and $\Delta G$) can be tuned by selection of the organic base, suitable R-group(s), suitable alcohols, and selected chain lengths of the alcohols. No limitations are intended by the description of the exemplary embodiments herein.

The growth medium controls nucleation, morphology, and anisotropic growth (i.e., growth along a selected axis) of the carbon-based nano-rods. The growth medium is formed by addition of a suitable iron (III) metal salt into the SWIL at a selected ratio. The iron (III) metal salt selected for synthesizing carbon-based nano-rods of the present invention is preferably pure iron (III) chloride ($FeCl_3$) obtained by sublimation or distillation. Concentration of the metal salt is selected from about 0.5% to about 5% by weight. Typical concentration of the $FeCl_3$ metal salt is from about 0.1 M to about 0.2 M. Concentration selected for the nano-rod synthesis reaction effects morphology and water desorption properties of the resulting nano-rods detailed further herein. In general, thicker nano-rods (width dimension) are observed when the concentration of the salt is greater. In general, thicker (wider) nano-rods desorb water at a lower RH compared to thinner nano-rods.

Growth of the nano-rods proceeds by heating the growth medium at selected incubation temperatures. Temperatures of the nano-rod growth medium control the morphology (shape), thickness, length, and water adsorption and desorption (expulsion) properties of the resulting nano-rods. Temperatures selected for use depend at least in part on the choice of switchable ionic liquid and the desired times for synthesis.

In the exemplary embodiment, incubation temperatures are preferably selected from about 180° C. to about 275° C. However, temperatures are not intended to be limited. For example, synthesis times depend on reactions that consume chemical constituents in the growth medium and incorporate the various chemical constituents into the structures of the resulting nano-rods. For example, incubation proceeds until the SWIL and the metal salt in the medium are consumed and reactions that incorporate components of the SWIL into the structure of the nano-rods are complete.

In some embodiments, incubation temperatures are selected from about 180° C. to about 200° C.

In some embodiments, incubation temperatures are selected from about 200° C. to about 225° C.

In some embodiments, incubation temperatures are selected from about 225° C. to about 250° C.

In some embodiments, incubation temperatures are selected from about 250° C. to about 275° C.

All temperatures that achieve desired nano-rod properties for selected applications and devices are within the scope of the present invention. No limitations are intended.

In some embodiments, synthesis time is about 4 hours or more. In some embodiments, synthesis time is from about 16 hours to about 24 hours. However, times for synthesis of the carbon-based nano-rods are not intended to be limited.

The process may optionally include isolating (removing) the carbon nano-rods from the growth medium, e.g., by centrifugation in a polar organic solvent.

Nano-rods recovered from the growth medium may be activated for use in selected applications by drying the isolated carbon-based nano-rods in an inert atmosphere at a selected temperature for a selected time prior to use. In one exemplary process, nano-rods are activated by drying the nano-rods in a nitrogen gas atmosphere for a time of about 10 hours (e.g., overnight) on average at a temperature of about 150° C. In other embodiments, drying temperature is selected from about 100° C. to about 200° C. However, no limitations are intended.

Resulting carbon nano-rods have unique water adsorption and desorption properties in the presence of moisture at selected relative humidities at selected pressures and temperatures. The term "adsorption" used herein refers to the process in which moisture in a vapor or liquid form condenses onto the surface of the carbon-based nano-rods which accumulates in the confined space positioned between nano-rods in their respective groupings, as described further herein. The term "desorption" refers to the process in which the accumulated moisture is spontaneously released from the confined space between the nano-rods, e.g., into the vapor phase.

Morphology

Figure 2:
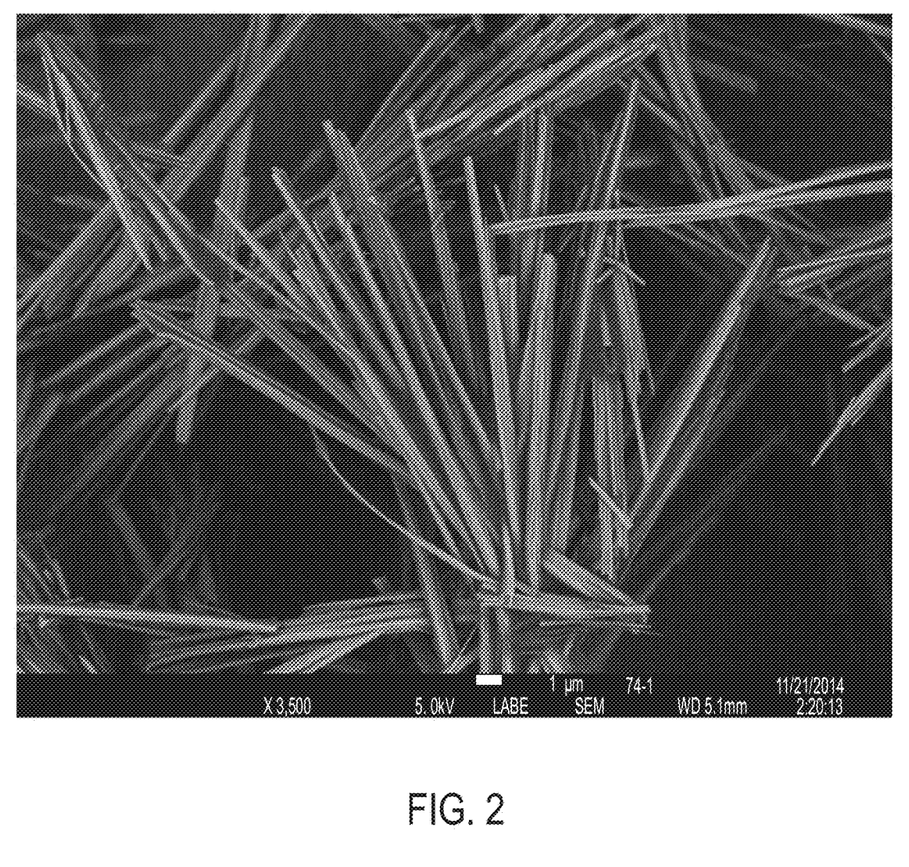
FIG. 2 is a SEM image of nano-rods synthesized in accordance with the present invention.

FIG. 2 is an SEM image showing carbon-based nano-rods synthesized in accordance with the present invention. As shown in the figure, carbon-based nano-rods are coupled together in bundles or groupings of two or more nano-rods via a junction or nexus located between the nano-rods. The junction between the nano-rods yields a characteristic morphology (structure) that yields characteristic adsorption and spontaneous desorption (release) properties in response to moisture. For example, the junction between the nano-rods changes dimensions (i.e., diameter) dynamically in response to relative humidity or moisture content. Each nano-rod in the bundle of nano-rods is smooth and includes a solid cross-section (i.e., are not hollow). High-resolution TEM analysis also shows the nano-rods are not crystalline

Nano-Rod Dimensions

Carbon-based nano-rods of the present invention include various dimensions and lengths.

In various embodiments, individual nano-rods include a thickness (width) dimension from about 10 nm to about 100 nm, for example, 10 nm, 20 nm, 30 nm, 40 nm, 50 nm, 60 nm, 70 nm, 80 nm, 90 nm, 100 nm, including combinations of these various thicknesses.

In some embodiments, nano-rods include a thickness (width) dimension from about 25 nm to about 50 nm.

In some embodiments, nano-rods include a thickness (width) dimension from about 50 nm to about 75 nm.

In some embodiments, nano-rods include a thickness (width) dimension from about 75 nm to about 100 nm.

In various embodiments, individual nano-rods include a length dimension from about 300 nm to about 300 microns (μm), for example, 350 nm; 400 nm; 450 nm; 500 nm; 550 nm; 600 nm; 650 nm; 700 nm; 750 nm; 800 nm; 850 nm; 900 nm; 950 nm; 1000 nm (1 μm); 50 μm; 100 μm; 150 μm; 200 μm; 250 μm; 300 μm; including combinations of these various lengths.

In some embodiments, nano-rods include a length dimension from about 1 μm to about 30 μm.

In some embodiments, nano-rods include a width (thickness) dimension of between about 20 nm to about 30 nm, and a length dimension of between about 10 μm to about 15 μm. No limitations are intended.

Carbon-based nano-rods of the present invention include a surface area at or below about 9 $m^2/g$, as determined from BET nitrogen sorption measurements. Nano-rods are also largely or substantially non-porous.

Composition

Chemical mapping of the nano-rods by Energy-Dispersive Spectroscopic (EDS) analysis shows the nano-rods include uniform distributions of carbon (C), nitrogen (N), iron (Fe), and sulfur (S). X-Ray Photoelectron Spectroscopy (XPS) analysis of as-synthesized carbon-based nano-rods gave representative compositions (atomic concentrations, %) as follows: Carbon (82.83%, [1s]); Oxygen (11.91%, [1s]); nitrogen (2.37%, [1s]); iron (0.63%, [2p]); and sulfur (2.26%, [2p]). TABLE 1 lists atomic concentrations of sulfur and nitrogen species of representative carbon-based nano-rods samples following synthesis and following exposure to moisture.

TABLE 1

| | Species | As-Synthesized (atomic concentration %) | Water-Exposed (atomic concentration %) |
|---|---|---|---|
| Sulfur | Fe—S | 44.3 | 24 |
| | C—S | 43 | 54.3 |
| | Sulfate | 10.3 | 16.8 |
| | Sulfite | 2.4 | 4.9 |
| Nitrogen | Pyridinic-N | 14.9 | 29.9 |
| | Pyrrolic-N | 59.7 | 58.2 |
| | Graphitic-N | 25.4 | 11.9 |

Data in the table show that following exposure to water, quantity of Fe—S species in the carbon-based nano-rods decreased while the quantity of C—S, sulfite, and sulfate species increased. The quantity of pyrrolic-N species is also dominant for both the as-synthesized samples and the water-exposed samples. Results further show that following water absorption, quantity of graphitic-N species decreased while the pyridinic-N species increased.

Water Adsorption and Desorption

Figure 3A:
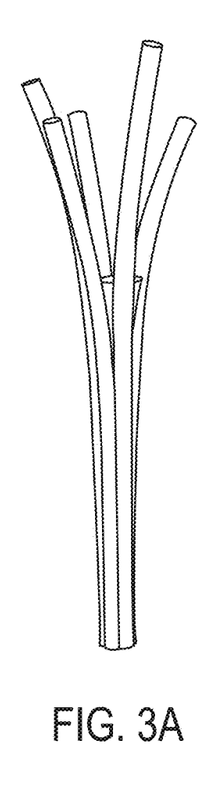
FIGS. 3A-3E illustrate the process of adsorption and desorption by carbon nano-rods of the present invention.
Figure 3B:
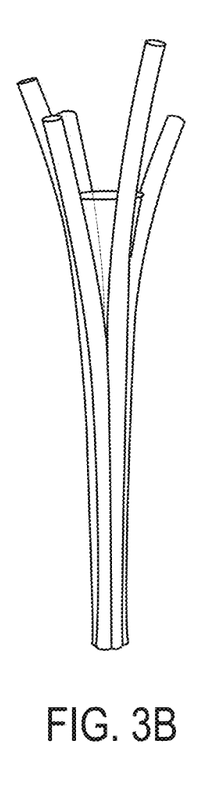
Figure 3C:
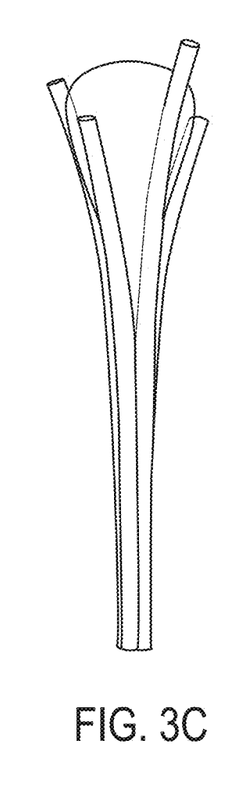
Figure 3D:
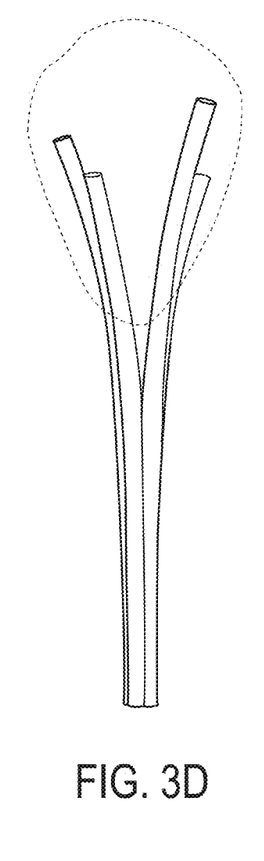
Figure 3E:
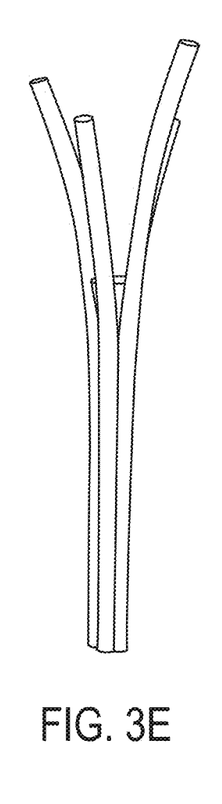

Following activation, carbon-based nano-rods of the present invention adsorb and desorb water dynamically. FIGS. 3A-3E illustrate the process of adsorption and desorption of water by a representative bundle of carbon-based nano-rods of the present invention. In FIG. 3A, nano-rods begin to adsorb moisture from the gaseous environment that is in contact with the nano-rods, which condenses in the confined space between adjacent nano-rods and accumulates as liquid water at the nexus or junction located between the nano-rods. The nexus changes dimensions (i.e., diameter) dynamically in contact with the accumulated water. For example, as shown in FIG. 3B, as RH increases, nano-rods continue to accumulate additional water at the junction or nexus between the nano-rods. Adjacent rods (with adjacent confined surfaces) in the various bundles begin to migrate closer together via capillary forces. In response, the diameter of the junction or nexus between the nano-rods decreases. In FIG. 3C, a greater quantity of liquid water accumulates at the junction or nexus located between the nano-rods, as illustrated. In FIG. 3D, once the size of the confining space between the nano-rods decreases to a critical dimension, for example, at a selected moisture threshold described further hereafter, a surface-induced cavitation (expulsion) phenomenon occurs, in which a substantial or otherwise significant fraction of condensed water accumulated in the confined space at the junction between the nano-rods spontaneously and rapidly releases from the surface of the nano-rods as a vapor. The unexpected expulsion of water is a reversible process attributed to interfacial forces that occur at the surfaces of the nano-rods in the confined space between the nano-rods as a function of relative humidity, a first experimental observation of confinement-mediated water cavitation in a nanomaterial. In FIG. 3E, following desorption, nano-rods begin to accumulate moisture again from the vapor environment as a function of relative humidity. Adsorption and desorption in the carbon-based nano-rods repeats or cycles indefinitely. Thus, nano-rods of the present invention are suitable for use in various humidity-responsive devices and processes that work entirely on adsorption and desorption, as discussed hereafter.

Figure 4A:
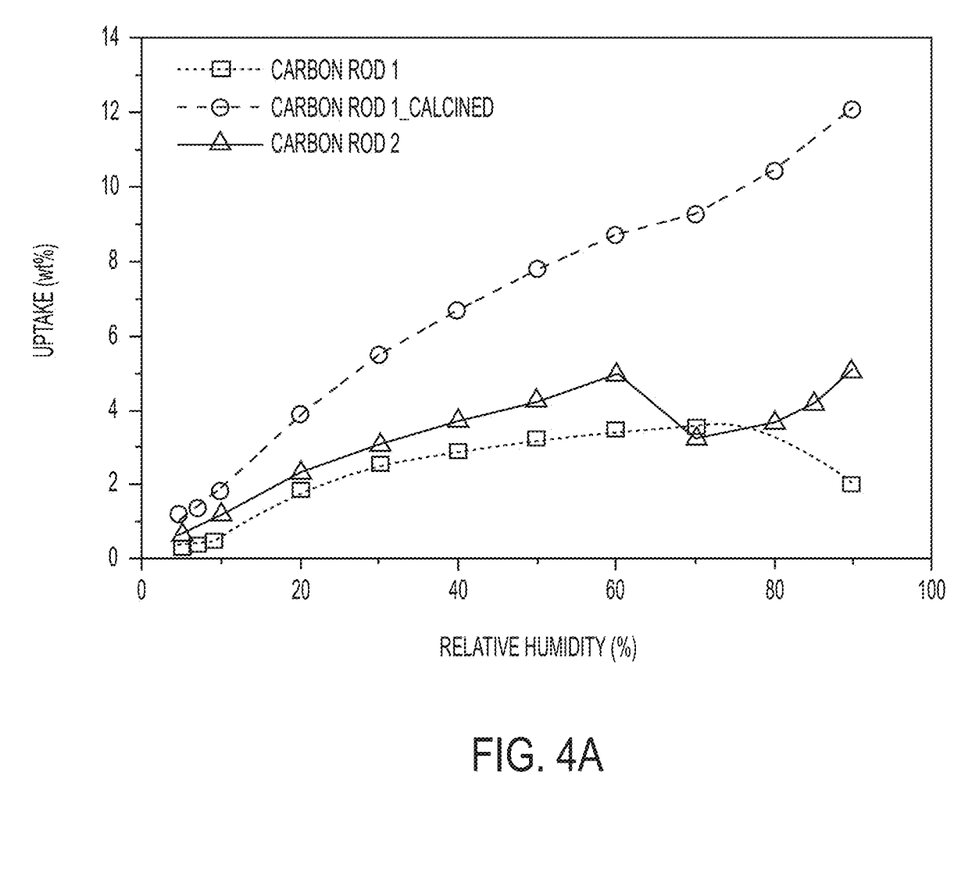
FIG. 4A is an exemplary water adsorption isotherm for different carbon nano-rods of the present invention.

FIG. 4A presents water adsorption isotherms at 25° C. as a function of relative humidity for different carbon-based nano-rods samples: a first carbon-based nano-rods sample (nanorods-1) prepared in a growth medium containing 0.1 M $FeCl_3$; a second carbon-based nano-rods sample (nanorods-2) prepared in a growth medium containing 0.2 M $FeCl_3$; and a carbon-based nano-rods sample calcined at 600° C. (calcined nanorods-1), respectively. In the figure, data show that weights of both the nanorods-1 sample and the nanorods-2 sample increased initially as a function of increasing relative humidity (RH). Nano-rods in Sample 1 initially adsorbed water up to a RH value of about 75%. Nano-rods in Sample 2 initially adsorbed water up to a RH value of about 60%. However, initial uptake of water is not intended to be limited to specific RH values. Nano-rods and their resulting water adsorption and desorption properties vary depending on synthesis conditions, as detailed herein. Thus, no limitations are intended.

Following initial uptake of water with increasing RH, a point is reached in the isotherm in which each set of nano-rods loses weight rapidly over a typically narrow range of RH values called a "transition region". In the transition region, nano-rods spontaneously desorb accumulated water into the vapor phase. Nano-rods in Sample 1 lose weight in a transition region beginning at an RH value above about 75%. Nano-rods in Sample 2 lose weight in a transition region beginning at an RH value of about 60%. The transition region can differ for each set of nano-rods depending on synthesis conditions. For these samples, transition regions appear in the isotherms at RH values from about 60% to about 70% (nanorods-2) and from about 75% to about 90% (nanorods-1), respectively.

Following the transition region, weight of the nano-rods increases again at higher RH values (as described previously in reference to FIG. 3E). For example, nano-rods in Sample 2 again adsorb water above an RH value of about 70%. Properties of the nano-rods are attributed to dynamic changes in dimensions of the junction or nexus in the confined space between the nano-rods. These dynamic changes in response to moisture provide adsorption of water to, and cavitation from, the nano-rods. However, the isotherm for the sample containing calcined nano-rods (i.e., nanorods-2 calcined at 600° C. in nitrogen for 6 h) showed significantly different results. In this sample, for example, the transition region was absent from the isotherm. Results are attributed to changes in surface or subsurface properties that fix dimensions of the nexus preventing the dynamic changes that provide the characteristic properties of adsorption of water to, and spontaneous desorption of water from, the nano-rods.

Figure 4B:
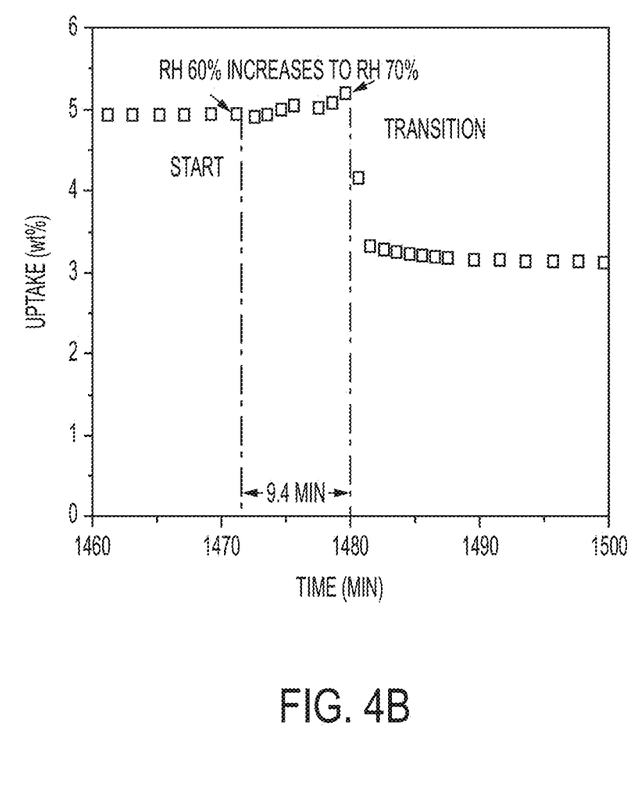
FIG. 4B is an exemplary water adsorption isotherm showing kinetic data for a selected set of carbon nano-rods.

FIG. 4B presents kinetic (or real-time uptake) data for adsorption of moisture in the transition region of the isotherm for the carbon-based nanorods-2 [0.2 M $FeCl_3$] sample discussed previously. As shown in the figure, weight of the sample increased from about 60% to about 70% in ~9.4 minutes in response to the increase in RH, indicating that water adsorption increased at the higher humidity, as expected. However, sample weight dropped suddenly and levelled out in the isotherm during the transition period. Here, a weight change of about 2 wt % for adsorbed water was observed, a significant result given that capacity for water adsorption in the sample is only about 4 wt % at an RH value of 90%. Result show the quantity of water expelled from the nano-rods in the transition region reached about 50% of the total adsorbed water.

Figure 4C:
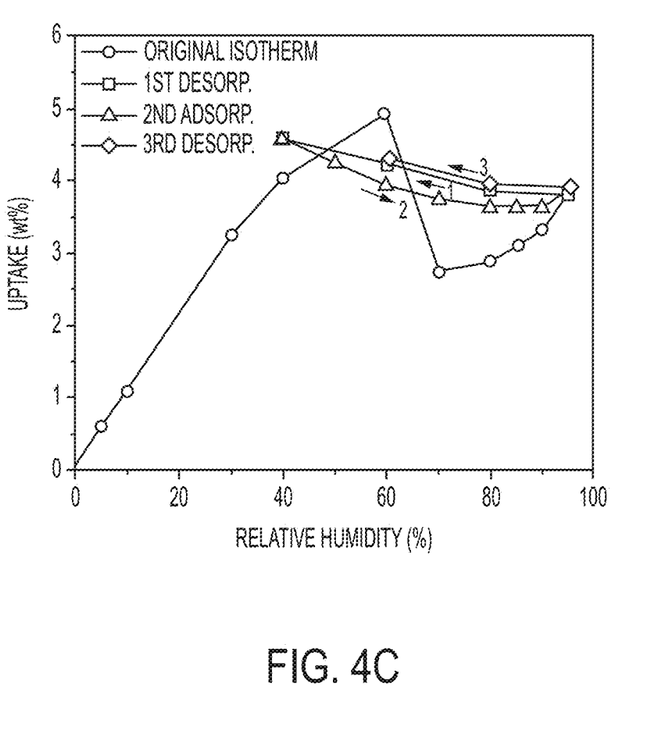
FIG. 4C is an exemplary water adsorption isotherm showing repeat cycling of water sorption isotherms at room temperature for a selected set of carbon nano-rods.

FIG. 4C is an exemplary water adsorption isotherm showing repeat cycles of adsorption and desorption at 25° C. for the carbon-based nano-rod-2 sample. In the figure, results show that adsorption and desorption behavior of the nano-rods repeats during each cycle. At a low RH, the sample increases in weight. And, at a high RH, the sample loses weight. Results demonstrate the ability to cycle the water expelling behavior.

Applications

Carbon-based nano-rods of the present invention provide adsorption and spontaneous desorption (i.e., moisture-mediated cavitation or expulsion) of accumulated water as a vapor, which can be implemented in various applications and devices. Applications and devices of this technology include, but are not limited to, for example, water collection; water purification; water separation; water-selective and water-responsive membranes; dehumidification; desiccation; water pumping; HVAC; humidity selection and control; humidity-responsive devices; energy storage; oxidation of hydrocarbons; and like applications and devices.

Figure 5A:
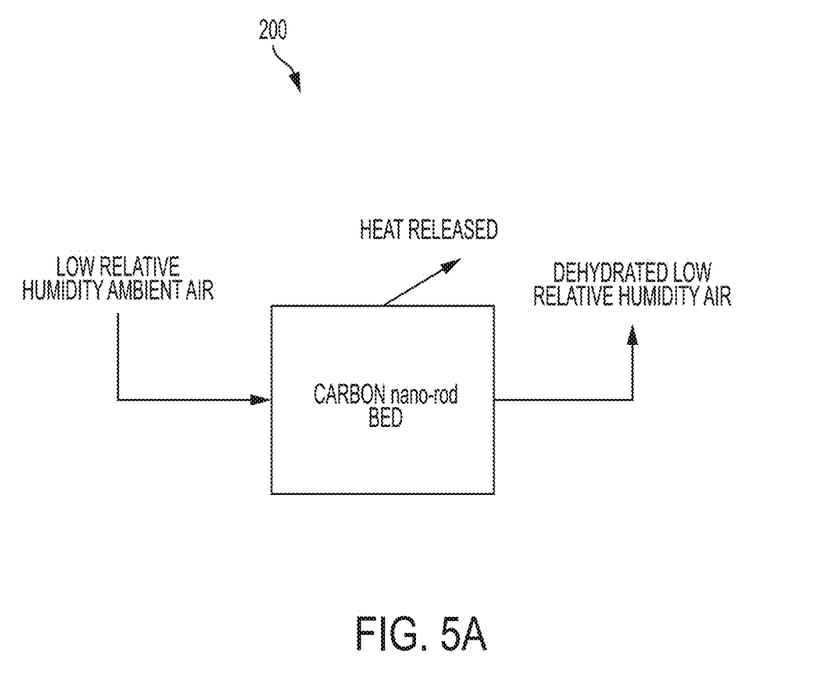
FIGS. 5A-5B illustrates modes of operation of an exemplary device of the present invention for recovering water.
Figure 5B:
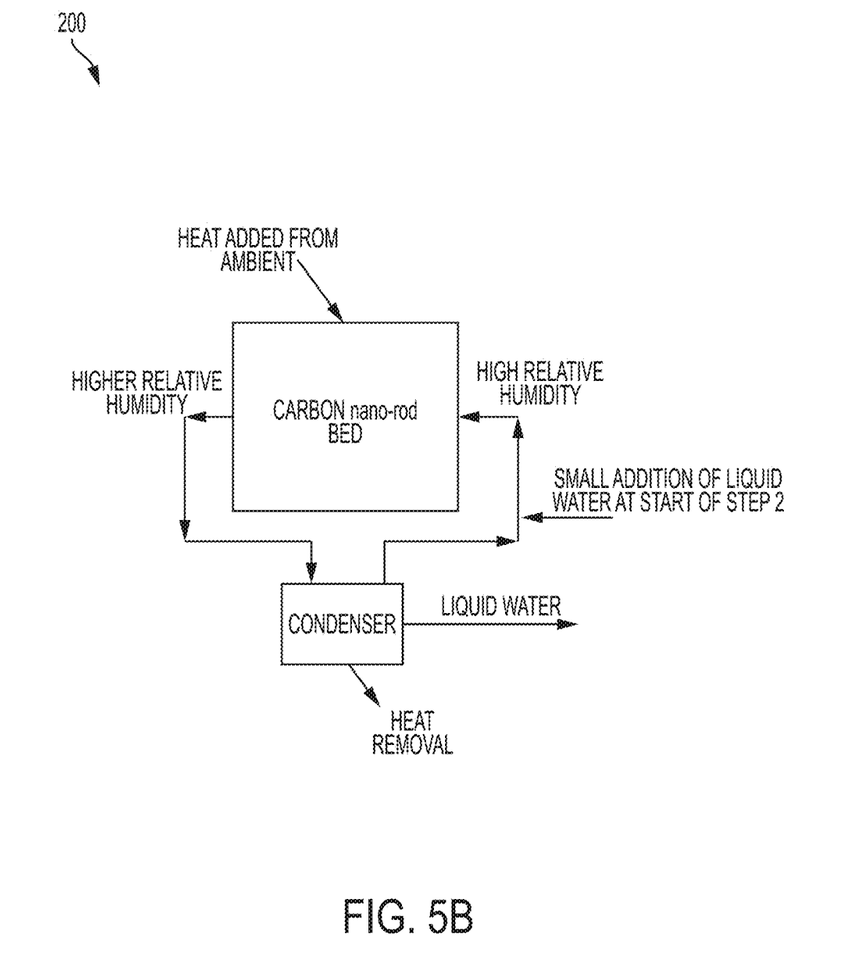

FIGS. 5A-5B illustrate different operation modes of an exemplary device 200 of the present invention for recovering water. The device incorporates carbon-based nano-rods of the present invention. In a first mode of operation illustrated in FIG. 5A, a bed containing carbon-based nano-rods is contacted by a gas (e.g., air) with a first (e.g., low) relative humidity, which causes the nano-rods to adsorb water at ambient temperature. Heat of adsorption is rejected to ambient either through heating of the flowing air stream or through circulation of a heat transfer fluid that absorbs heat from the bed and then discharges the heat to ambient air. The process continues until the bed is at or near an equilibrium temperature and humidity with ambient air.

In a second mode of operation illustrated in FIG. 5B, air within device 200 is circulated through a condenser and back to the bed containing carbon-based nano-rods. A sufficient amount of liquid water is evaporated into the gas flow upstream from the nano-rods bed to give the inlet stream to the bed a sufficiently high relative humidity (i.e., that is not saturated). Exposure of the nano-rods in the bed to the gas flow containing the high relative humidity shifts the equilibrium for water adsorption, causing the bed to desorb water that generates a flow stream with an even higher relative humidity. Once the air flow outlet from the nano-rods bed shifts to the higher relative humidity, addition of water is halted. The condenser then condenses water from the circulating air stream at a sub-ambient temperature. Because the condenser acts on the high relative humidity stream or air flow, condensation temperature does not need to be as cold as when condensing directly from ambient air. Thus, the instant device operates at a higher efficiency. As water condenses in the condenser, heat is added from ambient air to the nano-rods bed, which maintains temperature at or near ambient temperature. This mode of operation continues until the bed of nano-rods is at or near equilibrium temperature with the circulating high-humidity air stream. Air flow through the nano-rods bed is then switched back to ambient air, and the first mode of operation repeats its cycle with an equilibrium shift to adsorption of water from a lower RH air flow.

In some embodiments, devices are configured with a single bed containing carbon-based nano-rods. The bed cycles to provide adsorption of water from ambient air in a first mode of operation, and desorption of water to the gas phase in a second mode of operation. Released water is then condensed in a condenser or other recirculation system for collection.

In some embodiments, devices are configured with two beds containing carbon-based nano-rods to provide continuous recovery of water. A first bed provides adsorption of water from ambient air. A second bed desorbs water to the gas phase, which is then condensed in a condenser or other recirculation system for collection. In operation, first and second beds periodically switch modes of operation thereby enabling continuous recovery of water from the ambient atmosphere.

Figure 6:
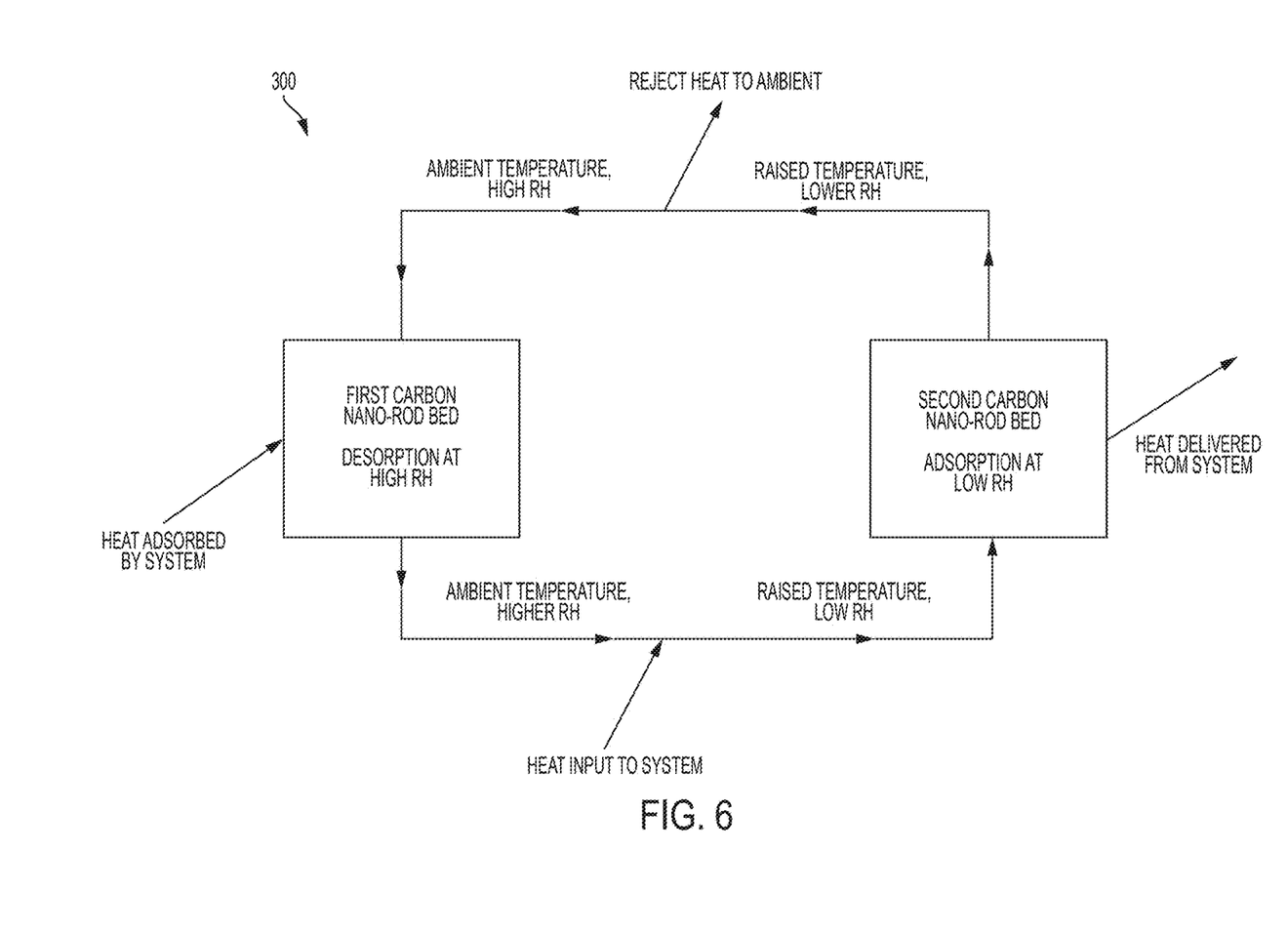
FIG. 6 illustrates an exemplary system of the present invention for heating and cooling.

FIG. 6 illustrates an exemplary system 300 of the present invention for cooling and heating. In the instant embodiment, the system incorporates dual beds containing carbon-based nano-rods of the present invention. However, while dual beds are described, the invention is not intended to be limited thereto. For example, in other embodiments, a single bed of carbon-based nano-rods may be used by cycling the single bed in a first cooling cycle followed by a second heating cycle or vice versa. Thus, no limitations are intended.

In the figure, a first bed containing carbon-based nano-rods receives a first gas at ambient temperature and high RH. Exposure to the high RH conditions causes desorption in the first bed of carbon-based nano-rods, which provides cooling within the bed. The bed can then deliver cooling when contacted by a gas stream that absorbs heat (e.g., air) delivered, for example, therein at ambient temperature. Cooling provided by the bed corresponds to the cooling duty provided by the system when the system is used as a heat pump operating in cooling mode. Desorption of water into the first gas provides a second gas as effluent from the first bed of nano-rods that contains a higher RH. As shown in the figure, heat is then added to the second gas to raise the temperature of the second gas and lower its relative humidity. Heat may be provided by heat sources known to those of ordinary skill in the art including low-temperature waste heat sources.

The higher-temperature second gas then enters the second bed of carbon-based nano-rods. Exposure of the nano-rods in the second bed to lower RH conditions causes the nano-rods to adsorb water, which releases heat within the second bed. Heat from the second bed is transferred to ambient air or another gas stream. Heat removed from the second bed represents a heat load when the system is operated as a heat pump in heating mode. The second gas is released as an effluent from the second bed at an elevated temperature and low RH. Heat is then rejected to ambient to cool the gas to a near ambient temperature and to raise the RH, which yields the first gas in the cycle. This first gas can then be cycled back to cool the first bed of carbon-based nano-rods, which repeats the operation cycle.

As the first bed becomes depleted in moisture and the second bed becomes loaded with moisture, first and second beds can switch operation as needed during operation such that first bed would perform heating and the second bed would perform cooling. Cooling and heating within the respective beds is performed to maintain a constant temperature within the first and second beds. In general, heating and cooling are performed with respective heat sources or heat sinks to maintain temperatures within the first and second beds within $\pm 10°$ C. of the average temperature of the carbon-based nano-rods in the respective beds during operation. However, no limitations are intended by the description of the exemplary embodiments herein.

EXAMPLES

The following Examples provide a further understanding of the invention.

Example 1

Preparation of SWIL

In an exemplary process, a switchable ionic liquid (SWIL) was prepared from an amidine- or guanidine-containing alkyl xanthate. In a two-neck round bottom flask, a solution containing a 1:1 mole equivalent ratio of dry and air-free DBU and 1-hexanol was stirred together in an inert atmosphere (e.g., a $N_2$-filled glove box) at 0° C. An equivalent of dry, air-free carbon disulfide ($CS_2$) was then was introduced drop-wise into the stirring liquid solution. The colorless solution turned dark orange after addition. The viscous solution was then degassed three times via a freeze-pump-thaw process using a dry ice-acetone bath before transferring the round bottom flask to a glove box. The SWIL was formed as the viscous solution became a dark orange solid over a period of about one hour.

Example 2

Synthesis of Carbon-Based Nano-Rods (I)

Carbon-based nano-rods were synthesized as follows. A 20 mL scintillation vial was charged with 30 mmol of the SWIL from EXAMPLE 1. The growth medium was then prepared by adding 0.90 mmol of iron chloride ($FeCl_3$) salt (0.1 M $FeCl_3$) to the SWIL. Contents were stirred with a stir bar. The vial was placed in a stainless steel Parr® pressure reactor and sealed. The reaction mixture was stirred at a temperature from about 180° C. to about 275° C. for 16-24 hours before cooling to room temperature. The reactor was opened. The viscous (dark red) solution inside the scintillation vial was diluted to 30 mL with dry, air-free methanol and centrifuged in a centrifuge tube to collect the black precipitate. The precipitate was washed with methanol, centrifuged, and decanted until the rinsate was colorless.

The resulting black powder was air-dried overnight in a fume hood to obtain the carbon-based nano-rods.

Example 3

Synthesis of Carbon-Based Nano-Rods (II)

Two samples of carbon-based nano-rods (denoted nano-rods-1 and nano-rods-2), were prepared according to the process described previously in EXAMPLE 2. Solutions containing 0.1 M and 0.2 M $FeCl_3$, respectively, were mixed with the amidine- or guanidine-containing alkyl-xanthate switchable ionic liquid prepared in EXAMPLE 1 to form a nano-rods growth medium. The growth medium was incubated at a temperature selected from about 180° C. to about 275° C. to form the respective nano-rods. Nano-rods were recovered at a length of from about 1 μm to about 30 μm. Doubling the concentration of the $FeCl_3$ salt in the growth medium from 0.1M to 0.2 M changed the thickness of the nano-rods from ~30 nm to ~100 nm.

Example 4

Water Sorption Experiments

Carbon-based nano-rods of the present invention were tested in dynamic water adsorption experiments in the presence of a continuous flow of humidified (non-adsorbing) nitrogen gas. Water vapor adsorption isotherms were obtained using a water vapor adsorption analyzer (VTI-SA$^+$, TA Instrument, Florida, USA). Relative humidity was achieved by controlling the ratio of the flow rates of the moisture stream out of the humidity generator using $N_2$ as the carrier gas. Carbon-based nano-rods samples were regenerated prior to the adsorption measurements over a period of 12 h at a temperature of 150° C. under a constant flow of dry $N_2$ gas. Water adsorption and desorption results are presented in FIGS. 4A-4C.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the scope of the present invention.

What is claimed is:

1. A method for making carbon-based nano-rods, comprising the step of:
   incubating a growth medium comprising a switchable ionic liquid comprising an amidine- or guanidine-containing base cation and an alkyl xanthate anion, and an iron (III) salt, at a selected temperature for a time sufficient to form carbon-based nano-rods of a selected size.

2. The method of claim 1, wherein the SWIL is formed by combining an amidine- or guanidine-containing base with an organic alcohol in a 1:1 mole ratio to form a solution, and adding an equal equivalent of carbon disulfide therein.

3. The method of claim 2, wherein the organic alcohol is a normal alcohol with a carbon number selected from C1 to C16.

4. The method of claim 1, wherein the amidine- or guanidine-containing base cation comprises diazabicyclo [5.4.0]-undec-7-ene, or 1,1,3,3 tetramethyl guanidine.

5. The method of claim 1, wherein the iron (III) salt is a pure iron (III) chloride salt derived by distillation or sublimation.

6. The method of claim 1, wherein the incubation temperature is selected from 180° C. to 275° C.

7. The method of claim 1, wherein the nano-rods are in groupings of 2 or more nano-rods with a *nexus* disposed between the nano-rods that binds the nano-rods together thereat.

8. The method of claim 1, wherein the nano-rods include a solid cross-section.

9. A composition, comprising:
   carbon-based nanorods that adsorb a first quantity of water when exposed to a first relative humidity at a selected pressure and temperature and spontaneously desorbs water when exposed to a second relative humidity greater than the first relative humidity at the same pressure and temperature, the carbon based nanorods, made by a process wherein a switchable ionic liquid having an amidine or guanidine-containing base cation and an alkyl xanthate anion is combined with an iron (III) salt and incubated at a temperature between 180° C. to 275° C. for a preselected period of time less than 24 hours.

10. The composition of claim 9, wherein the a majority of the individual carbon-based nano-rods have a solid cross-section.

11. The composition of claim 9, wherein the carbon-based nanorods spontaneously desorbs water into the gas phase at the second relative humidity.

12. The composition of claim 9 wherein the preselected time for incubation is more than 4 hours.

13. The composition of claim 9, wherein the amidine- or guanidine containing base cation comprises diazabicyclo (5.4.0)-undec-7-ene, or 1,1,3,3 tetramethyl guanidine.

14. The composition of claim 9 wherein the iron (III) salt is a pure iron (III) chloride salt.

15. The composition of claim 9 wherein the carbon-based nanotubes comprise sulfur.

* * * * *